Nov. 8, 1966 G. R. DOUGLAS 3,284,761
TRANSDUCER
Filed Aug. 18, 1964
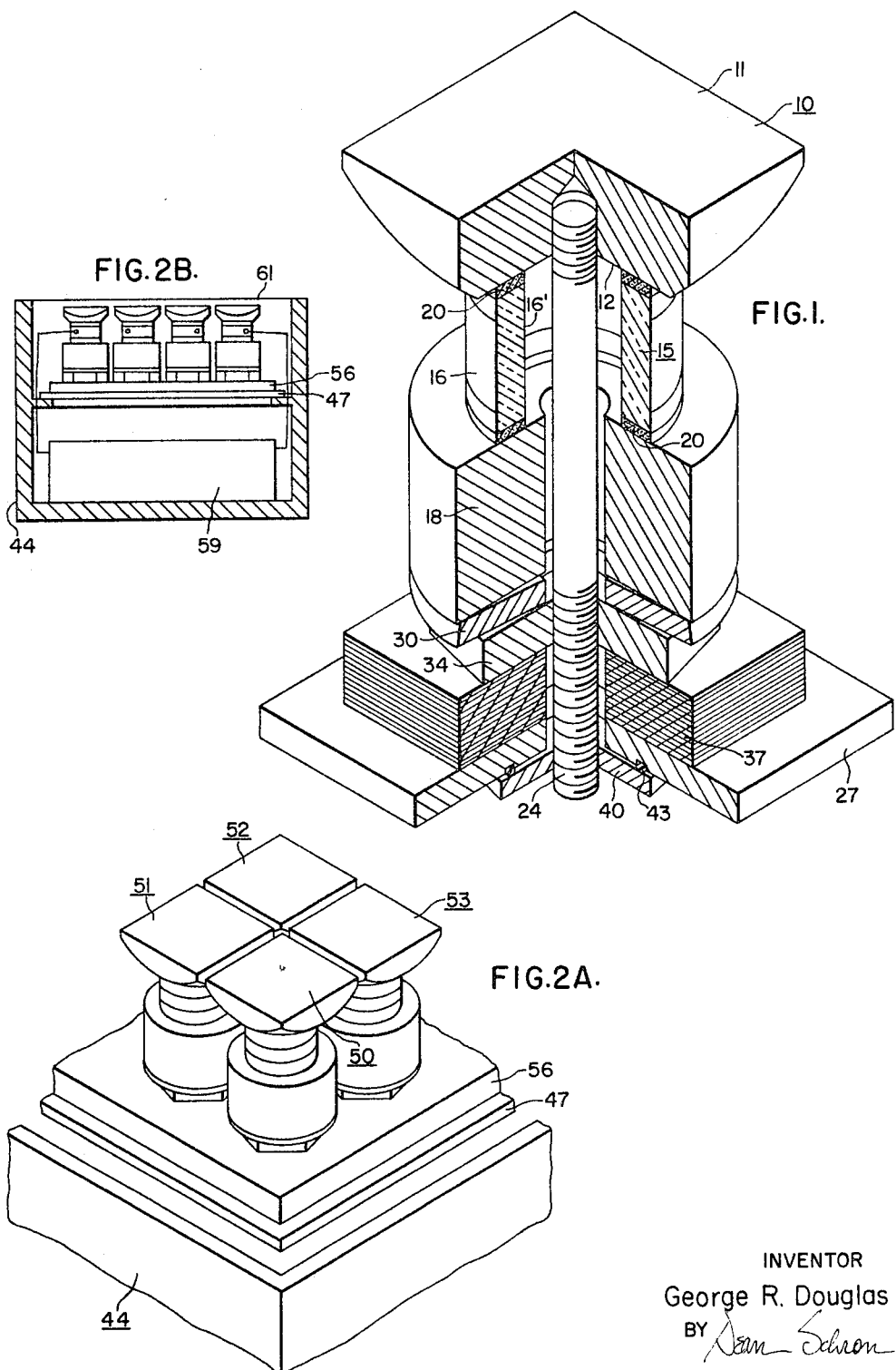
INVENTOR
George R. Douglas
BY
ATTORNEY ent Office 3,284,761
Patented Nov. 8, 1966

3,284,761
TRANSDUCER
George R. Douglas, Wilkinsburg, Pittsburgh, Pa., assignor to Westinghouse Electric Corporation, Pittsburgh, Pa., a corporation of Pennsylvania
Filed Aug. 18, 1964, Ser. No. 390,290
8 Claims. (Cl. 340—10)

This invention in general relates to transducers, and more in particular to underwater sound transducers for use in sonar systems.

A common type of underwater sonar transducer comprises a piston, or head member, for radiating and/or receiving sonic energy, a driving means coupled to the head member, and a massive tail member forming a reaction mass upon which the driving means pushes. The transducer is designed to be resonant at a certain operating frequency in order to derive maximum efficiency. Common types of driving means include magnetostrictive and piezoceramic drive means. One consideration in designing transducers, especially where piezoceramic elements are utilized, is that the driving member should not be subjected to a tensile stress and to this end the driving means is generally prestressed into a compressive state so that upon vibratory expansion thereof the tendency is to return to a normal, rather than to a tensile stress condition.

The transducer assembly is mounted on some sort of a mounting plate with spring means interposed between the mounting plate and the tail member. For utilization in shallow waters this type of construction is satisfactory, however, when deeper depths are encountered the static water pressure forces on the head member of the transducer are transmitted through the driving means changing its elastic properties, and consequently changing the resonant characteristic and decreasing the efficiency of the transducer. Additionally, when the water pressure compresses the spring member to a point where it is no longer resilient, the mouting plate is directly coupled to the tail member changing the motional mass thereof which also tends to change the resonant frequency and reduce the vibratory motion and radiation efficiency of the head member.

At depths where the spring means loses its characteristics, the high frequency acoustic energy forces, herein termed dynamic forces are coupled to the mounting plate. In sonar systems utilizing an array of transducers all mounted on the same mounting plate, and wherein the transducers are variably phased, the transmission of the dynamic forces to the mounting plate would cause interaction between the transducers tending to tie them all together and thus destroying the variable phase relationships.

To overcome some of these problems, transducers have been constructed wherein the head member is supported on a mounting plate through a compliant backing. For deep oceanic operation it is necessary that special supporting structure be incorporated so that the mounting plate, having a plurality of relatively large holes for receiving the transducers of an array, will not weaken or deflect out of shape under the pressures encountered. Additionally, the supporting structure does not allow close enough spacing between transducers in certain array configurations.

It is a primary object of the present invention to provide an underwater transducer which will operate at deep oceanic depths.

Another object is to provide an underwater sonar transducer of relatively simple mechanical construction.

It is a further object to provide a transducer which is particularly well adapted for use in transducer array system.

A further object is to provide a transducer for a transducer array sonar system wherein variable phase relationships between transducers are not destroyed at deep ocean depths.

Briefly, in accordance with above objects, the broad concept of the invention comprises a transducer of relatively simple construction wherein the radiating head is operably coupled through compliant backing means to a mounting plate thus directly transmitting any static pressure forces on the head directly to the mounting plate without transmitting the force through the active driving means of the transducer. Dynamic forces are coupled to the compliant backing means where they are filtered out. The objects and the basic concept are accomplished in the present invention, one illustrative embodiment of which comprises a radiating head member and a relatively massive tail member with an active driving member located between, and coupled to, both the head and tail members. A rod-like member directly connects the radiating head with a mounting plate through resilient backing means. Secured to, and preferably rotatably mounted on the rod-like member is a force transmittal member which operates through a spring, contacting the tail member, to prestress the driving member. Interposed between the force transmittal member and the mounting plate is a compliant backing, the construction and arrangement of the transducer being such that any static pressure on the radiating head member is transmitted through the rod-like member to the force transmittal member and thence through the compliant backing to the mounting plate while dynamic forces are filtered out by the compliant backing. The above stated as well as further objects and advantages of the present invention will become more apparent upon a studying of the following detailed specification taken in conjunction with the drawings, in which:

FIGURE 1 illustrates a preferred embodiment of the present invention; and

FIGURES 2A and 2B illustrate a typical transducer array system incorporating the principles of the present invention.

Referring now to the drawings, and in particular to FIG. 1, there is shown a transducer incorporating the features of the present invention. The transducer includes a radiating head member 10 for transmitting and/or receiving acoustic energy in a fluid medium, and includes a front surface 11 and a back surface 12. Driving means 15 is provided and in a preferred embodiment constitutes a piezoceramic member such as a lead-zirconate-titanate (PZT) transducer driving means which is commercially available in many shapes and forms. In the transducer embodiment described herein, the driving means 15 is shown to be of tubular construction which will facilitate the assembling of the transducer. Electrodes 16 and 16' are provided on the outer and inner surfaces respectively of the driving means 15 in order to couple energy to and extract energy from the piezoceramic driving member. A reaction mass, upon which the driving member 15 reacts, is provided in the form of reaction mass tail member 18 preferably of a greater mass than the head member 10. The head 10 may be constructed of aluminum and the tail member 18 may be constructed of brass. Driving means 15 is interposed between the head member 10 and the tail member 18 and is operably connected to these two members such as by an epoxy resin glue 20.

Coupling the head member 10 to a mounting means such as mounting plate 27, is rod-like member 24 preferably in the form of a stress bolt which may be secured to the head member 10 by threaded engagement.

The rod-like member or stress bolt 24 is made of a material such as high strength aluminum, so that slowly varying static forces may be transmitted thereby while the higher frequency dynamic variations are somewhat attenuated thereby. One end of the stress bolt 24 is secured to the head member 10 and the other end extends through the mounting plate 27 and is secured thereto by means including securing nut 40 and resilient O-ring 43. In order to prestress the piezoceramic drive means 15, a spring member 30 is included and takes the form of disk spring 30 which abuts the reaction mass tail member 18. Operatively connected to the stress bolt 24 is radially extending force transmittal means 34 and in its simplest form may be a nut locking member which is threadedly engaged on and rotatable relative to the stress bolt 24. The nut 34 is tightened to a degree such that a pressure is transmitted through the disk spring 30 to prestress the piezoceramic driving member 15. This disk spring 30 insures that the pre-compression stress of the driving member 15 remains substantially constant and does not change with varying static pressures on the front surface 11 of the head member 10.

If the stress bolt 24 were directly connected to the mounting plate 27 and secured thereto, a restraint would be imposed upon the head member 10 which would effectively increase the motional mass thereof. This restraint would substantially reduce efficiency by causing a change in the resonant frequency of the transducer. Since the motional mass would be increased, the vibratory motion thereof would reduce to an extent where the radiation efficiency of the head member decreases. In order to maintain the resonant frequency and high radiation efficiency of the transducer, in addition to preventing dynamic interaction with other transducers when used in an array, the operative connection of the transducer to the mounting plate 27 is made through compliant backing means 37. Basically, compliance is the reciprocal of stiffness, that is, the displacement corresponding to the application of force, the units being for example cm./dyne or in./lb. or meters/newton. The compliant backing means 37 is characterized by having a relatively high compliance, for example, at least 100 times that of the driving member 15, and additionally having a high crushing strength. This requires a backing means with an elastic modulus of approximately .1% to 1% of that of the driving means 15. One type of backing means which meets these characteristics comprises a plurality of sheets, or laminations of paper, or paper-like material, a suitable paper being commonly used onion skin paper. The effective elastic modulus of the onion skin paper is in the order of approximately 14,000 pounds per square inch (p.s.i.) measured at a pressure of 100 p.s.i., while the elastic modulus of the ceramic driving means 15 is in the order of 10 to 11 million pounds per square inch. The number of sheets of paper used will depend upon various design considerations such as relative sizes, masses and positioning of transducer elements, as well as maximum depths at which the transducer is to be utilized. By way of example only, a satisfactorily operating transducer has been built in accordance with the teachings of the present invention and includes as its head member a substantially square aluminum element of approximately ¾ of an inch on one side, and the reaction tail mass member comprised a brass element. A PZT driving element was bonded to the head and tail members by means of epoxy glue. The stress bolt was high grade aluminum and the distance from the front surface of the head member 10 to the mounting plate 27 was approximately 1 inch with the thickness of compliant backing means, which was a plurality of sheets of onion skin paper, being in the order of a sixteenth of an inch. The transducer was designed for an operating frequency of approximately 60 kilocycles/second.

At deep oceanic depths where high static pressures may be encountered, for example at depths greater than 1000 feet, the transducer of the present invention provides satisfactory operation in maintaining its high efficiency. In operation, static pressure forces applied to the front surface 11 of the head member 10 are transmitted down the stress bolts 24 to the force transmittal means 34. From the force transmittal means 34 the forces are transmitted to the mounting plate 27 through the compliant backing means 37 which compresses and maintains its high compliance and low elastic modulus as the forces increase. The disk spring 30 maintains the pre-compressive stress on the drive member 15 and the compliant backing means 37 maintains dynamic isolation of the transducer with the mounting plate 27 and prevents the mounting plate 27 from affecting the head member 10 and changing the resonant frequency characteristics of the transducer. Since dynamic forces are not coupled to the mounting plate 27, interaction between a plurality of transducers mounted on the plate is prevented, and to this end reference should be made to FIGS. 2A and 2B.

FIGS. 2A and 2B show two views of a transducer array incorporating, by way of example, four transducers constructed according to the principles of the transducer illustrated in FIG. 1. Generally, some sort of housing 44 is provided for receiving a mounting plate 47. The mounting plate 47 has a plurality of small holes therein for receiving the respective stress bolts of the four transducers 50, 51, 52 and 53. In order to facilitate in the assembling of the transducer array, the compliant backing material takes the form of a plurality of stacked sheets, or pad of paper 56, preferably onion skin type paper and which has a plurality of holes therein each hole being respectively aligned with a corresponding hole in the mounting plate 47 so that a stress bolt from a respective transducer 50 to 53 may be placed through the holes to be secured to the mounting plate 47. Since the transducers are in effect supported from the rear, the need for special supporting and reinforcing structure to the head members is eliminated and the head members of the transducers may be placed in close proximity to one another, a desirable feature in many applications. Electronic components generally designated at 59 are provided, as is well known to one skilled in the art, to form operative connections with the individual transducers for desired operation. A flexible covering member 61 such as neoprene rubber, is provided in order to prevent the fluid medium in which the transducer array is operating from contacting the transducer elements and electronic equipment. It is to be noted that the aforementioned static pressures are applied to the individual head members of the transducers through this covering member.

Although one embodiment of the present invention has been shown and described, it is to be understood that various modifications become apparent to one skilled in the art and that other combinations and arrangements may be made in light of the above teachings.

What is claimed is:
1. A transducer comprising:
   a radiating head member;
   driving means coupled to said radiating head member;
   spring means coupled to said driving means for maintaining said driving means in a constant prestressed condition;
   mounting means;
   a force transmitting means;
   compliant backing means interposed between said mounting means and said force transmitting means; and
   means coupling said head member directly with said force transmitting means for transmitting static forces on said head member, to said mounting means, through said backing means.
2. A transducer comprising:
   a head member;

a reaction mass tail member;
piezoceramic driving means connected to both said head and tail members;
mounting means;
force transmittal means;
spring means interposed between said tail member and said force transmittal means for maintaining said piezoceramic drive means in a compressive stressed condition;
backing means characterized in having a relatively high compliance relative to said piezoceramic drive means and being of a high crushing strength, interposed between and abutting both said force transmitting means and said mounting means; and
means affixed to said head member and said force transmitting means for transmitting static forces on said head member to said mounting means through said backing means.

3. A transducer comprising:
a radiating head member;
a reaction mass tail member;
driving means interposed between, and connected to, said head and tail members;
spring means abutting said tail member;
mounting means;
a rod-like member having one end connected to said head member and the other end connected to said mounting means;
force transmittal means operatively connected to said rod-like member for applying a compressive force to said driving means through said spring means; and
compliant backing means located between said force transmittal means and said mounting means, any static force on said head member being coupled through said rod-like member to said force transmittal means, and to said mounting means through said compliant backing means.

4. A transducer for transmitting and receiving sonic energy in a fluid medium comprising:
a head member;
a stress bolt affixed to, and extending from said head member;
driving means surrounding said stress bolt and coupled to said head member;
a reaction mass member surrounding said stress bolt and operatively connected to said driving means;
a locking nut rotatably mounted on said stress bolt;
a disk spring member abutting said reaction mass member;
said locking nut being operable upon rotation thereof to compressively stress said driving means through said disk spring member;
compliant backing means characterized by having an elastic modulus of approximately .1% to 1% of the elastic modulus of said driving means;
mounting means;
said compliant backing means being located between said locking nut and said mounting means for transmitting any static force exerted on said head member through said bolt, to said mounting means.

5. A transducer comprising:
a head member for radiating and receiving sonic energy;
a reaction mass member;
driving means interposed between and coupled to said head and reaction mass members;
a stress bolt member affixed to said head member and extending through said driving means and reaction mass member;
a spring member;
a locking member radially extending from said stress bolt;
said spring member being interposed between said locking member and said reaction mass;
said locking member in conjunction with said stress bolt exerting a stressing force on said driving means; and
a plurality of sheets of paper located behind said locking member for resiliently transmitting any static force exerted thereby to a mounting member.

6. A transducer comprising:
a head member;
a stress bolt threadedly engaging said head member;
a cylindrical piezoceramic drive member surrounding said stress bolt and being operatively connected to said head member;
a reaction mass operatively connected to said cylindrical piezoceramic drive member;
a disk spring engaging said reaction mass;
a nut threadedly engaging said stress bolt for applying a force through said disk spring to place said drive member into compression;
mounting means for receiving an end of said stress bolt;
a plurality of sheets of paper interposed between, and in force transmittal relationship with, said nut and said mounting means.

7. A transducer comprising:
a substantially square head member;
a stress bolt having one end coupled to said head member;
a cylindrical lead-zirconate-titanate piezoceramic drive member surrounding said stress bolt and being coupled to said head member;
a reaction mass member having a mass greater than that of said head member, coupled to said drive member;
a spring member engaging said reaction mass;
a nut threadedly engaging said stress bolt for applying a force through said spring member to place said drive member into compression;
mounting means for receiving the opposite end of said stress bolt; and
a plurality of sheets of onion skin paper interposed between, and in force transmittal relationship with, said nut and said mounting means.

8. A transducer array comprising:
a housing;
a mounting plate positioned within said housing;
said mounting plate having a plurality of apertures therein;
a pad-like plurality of sheets of paper for contact with said mounting plate and having a plurality of apertures therethrough, said apertures being in alignment with the apertures of said mounting plate;
a plurality of transducers, each including a rod-like member extending through a respective one of said co-aligned apertures for mounting each of said transducers to said mounting plate; and
covering means for preventing communication of said transducers with a fluid medium.

References Cited by the Examiner
UNITED STATES PATENTS

| | | | |
|---|---|---|---|
| 2,945,208 | 7/1960 | Samsel | 340—10 |
| 3,068,446 | 12/1962 | Ehrlich et al. | 340—8 |
| 3,110,825 | 11/1963 | Miller | 340—10 X |

References Cited by the Applicant
Experimental Preloaded Ceramic Transducer, by H. J. Clarke and P. M. Kendig, Technical Note, File No. TN 7.3386-03, April 24, 1963, Ordnance Research Laboratory, the Pennsylvania State University, University Park, Pa.

CHESTER L. JUSTUS, *Primary Examiner.*

J. P. MORRIS, *Assistant Examiner.*